(12) United States Patent
Jeon et al.

(10) Patent No.: US 10,862,604 B2
(45) Date of Patent: Dec. 8, 2020

(54) INTERFERENCE CONTROL METHOD AND DEVICE IN WIRELESS COMMUNICATION SYSTEM

(71) Applicant: Samsung Electronics Co., Ltd., Suwon-si (KR)

(72) Inventors: Joseph Jeon, Seongnam-si (KR); Eunyong Kim, Yongin-si (KR); Byungwook Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/767,866

(22) PCT Filed: Oct. 19, 2016

(86) PCT No.: PCT/KR2016/011761
§ 371 (c)(1),
(2) Date: Apr. 12, 2018

(87) PCT Pub. No.: WO2017/069515
PCT Pub. Date: Apr. 27, 2017

(65) Prior Publication Data
US 2018/0309531 A1 Oct. 25, 2018

(30) Foreign Application Priority Data
Oct. 19, 2015 (KR) .......................... 10-2015-0145577

(51) Int. Cl.
*H04W 72/08* (2009.01)
*H04J 11/00* (2006.01)
(Continued)

(52) U.S. Cl.
CPC ....... *H04J 11/0053* (2013.01); *H04J 11/0056* (2013.01); *H04L 27/2691* (2013.01); *H04W 72/082* (2013.01); *H04W 24/10* (2013.01)

(58) Field of Classification Search
CPC .... H04J 11/00; H04J 11/0053; H04J 11/0056; H04L 1/00; H04L 1/06; H04L 5/00;
(Continued)

(56) References Cited

U.S. PATENT DOCUMENTS

2012/0113812 A1 5/2012 Ji et al.
2013/0114434 A1* 5/2013 Muruganathan ...... H04W 16/14
370/252
(Continued)

FOREIGN PATENT DOCUMENTS

CN 104170446 A 11/2014
CN 104968050 A 10/2015
(Continued)

OTHER PUBLICATIONS

European Search Report dated Sep. 24, 2018, issued in European Patent Application No. 16857773.2.
(Continued)

*Primary Examiner* — Shawkat M Ali
(74) *Attorney, Agent, or Firm* — Jefferson IP Law, LLP

(57) ABSTRACT

Disclosed is a 5G or pre-5G communication system to be provided for supporting a data transmission rate higher than that of a 4G communication system such as LTE. According to one embodiment of the present invention, a method by which a device for adjusting the interference of a plurality of base stations transmits and receives data to and from the plurality of base stations comprises: receiving channel information of a terminal connected to one or more macro base stations or to one or more small base stations from the one or more macro base stations or the one or more small base stations; receiving ABS pattern information from the one or more macro base stations; generating, for each base station, interference control information for the one or more macro base stations or the one or more small base stations on the
(Continued)

basis of the ABS pattern information and the channel information of the terminal connected to the one or more macro base stations or to the one or more small base stations; and transmitting, to each base station, the interference control information generated for each base station.

4 Claims, 10 Drawing Sheets

(51) Int. Cl.
*H04L 27/26* (2006.01)
*H04W 24/10* (2009.01)

(58) Field of Classification Search
CPC ....... H04L 5/0032; H04L 12/26; H04L 27/26; H04L 27/2691; H04W 24/00; H04W 24/10; H04W 36/08; H04W 72/08; H04W 72/12; H04W 72/082; H04W 84/04
USPC ........ 370/252, 329, 331, 336; 375/219, 295, 375/316, 346
See application file for complete search history.

(56) References Cited

U.S. PATENT DOCUMENTS

| | | |
|---|---|---|
| 2013/0121191 A1 | 5/2013 | Song et al. |
| 2013/0195053 A1 | 8/2013 | Jeon et al. |
| 2013/0225193 A1 | 8/2013 | Lee et al. |
| 2013/0272274 A1* | 10/2013 | Ishida ................. H04W 72/082 370/336 |
| 2014/0355470 A1 | 12/2014 | Nagata et al. |
| 2015/0016387 A1 | 1/2015 | Elmdahl et al. |
| 2015/0124733 A1 | 5/2015 | Lim et al. |
| 2015/0139134 A1 | 5/2015 | Dinan |
| 2015/0207596 A1 | 7/2015 | Kroener et al. |
| 2015/0237517 A1* | 8/2015 | Hwang ................. H04L 1/0026 370/252 |
| 2015/0257164 A1* | 9/2015 | Lim ........................ H04L 43/04 370/252 |
| 2016/0345338 A1 | 11/2016 | Kim et al. |
| 2017/0288840 A1* | 10/2017 | Xu ........................ H04W 16/32 |

FOREIGN PATENT DOCUMENTS

| | | |
|---|---|---|
| EP | 2 451 234 A2 | 5/2012 |
| EP | 3 101 934 A1 | 12/2016 |
| KR | 10-2013-0089202 A | 8/2013 |
| KR | 10-2013-0090669 A | 8/2013 |
| KR | 10-2013-0107158 A | 10/2013 |
| KR | 10-2015-0089892 A | 8/2015 |
| WO | 2015/034668 A1 | 3/2015 |
| WO | 2015/115785 A1 | 8/2015 |
| WO | 2015/115787 A1 | 8/2015 |

OTHER PUBLICATIONS

Nokia Siemens Networks, "On X2 signaling for TDM eICIC in Macro-nPico scenarios", 3GPP Draft; R3-103555, EICIC_X2_PICOMACRO_TDMEICIC, 3rd Generation Partnership Project (3GPP), Mobile Competence Centre; 650, Route Des Lucioles; F-06921 Sophia-Antipolis Cedex; France, 3GPP TSG RAN WG3, #70 Meeting, Jacksonville, USA, Nov. 8, 2010, XP050496635.
Extended European Search Report dated Feb. 14, 2019, issued in European Patent Application No. 16857773.2.
Chinese Office Action dated Jun. 3, 2019, issued in Chinese Patent Application No. 201680061284.2.
Chinese Office Action dated May 6, 2020, issued in a counterpart Chinese Application No. 201680061284.2.

* cited by examiner (a)

(b)

(c)

INTERFERENCE CONTROL METHOD AND DEVICE IN WIRELESS COMMUNICATION SYSTEM

TECHNICAL FIELD

The present disclosure relates to an interference control method and device in a wireless communication system, and more particularly, to a method and device for controlling interference of a base station in a wireless communication system in a heterogeneous network environment in which a small base station is mixed.

BACKGROUND ART

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive multi-input multi-output (massive MIMO), full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed.

In addition, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

A $3^{rd}$ generation partnership project (3GPP) standard defines a signal between a base station and a terminal so that a terminal may distinguish and measure channel information from a neighboring base station including a serving base station, and feed back the distinguished and measured channel information to the serving base station, in order to support a coordinated multi-point (CoMP) operation for inter-base station interference control and cooperative communication.

Release 11 of the 3GPP standard defines further enhanced inter cell interference cancellation (FeICIC) for interference control in a case in which a low power base station is deployed in an area of a macro base station. According to the FeICIC, interference of the macro base station on a terminal receiving data from the low power base station may be controlled in a time period (subframe) unit (e.g., almost blank subframe (ABS)). Further, the FeICIC defines a signal for transferring information received by a small base station from a macro base station to a terminal so that the terminal mitigates interference (cell-specific reference signal-interference mitigation (CRS-IM)) by a common reference signal (CRS) transmitted by the macro base station in an ABS zone.

DISCLOSURE OF INVENTION

Technical Problem

The present disclosure describes an operation for using a centralized interference control function together for base stations supporting a further enhanced inter cell interference cancellation (FeICIC) function in a heterogeneous network in which a macro base station and a small base station are mixed.

Solution to Problem

According to an embodiment of the present disclosure, a method by which a device for adjusting interference of a plurality of base stations transmits and receives data to and from the plurality of base stations, the method includes: receiving channel information of a terminal connected to one or more macro base stations or one or more small base stations from the one or more macro base stations or the one or more small base stations; receiving almost blank subframe (ABS) pattern information from the one or more macro base stations; generating, for each base station, interference control information for the one or more macro base stations or the one or more small base stations based on the almost blank subframe pattern information and the channel information of the terminal connected to the one or more macro base stations or the one or more small base stations; and transmitting, to each base station, the interference control information generated for each base station.

According to another embodiment of the present disclosure, a device for adjusting interference of a plurality of base stations includes: a communication unit configured to transmit and receive data to and from one or more macro base stations or one or more small base stations; and a controller configured to control to receive channel information of a terminal connected to the one or more macro base stations or the one or more small base stations from the one or more macro base stations or the one or more small base stations, receive almost blank subframe pattern information from the one or more macro base stations, generate, for each base station, interference control information for the one or more macro base stations or the one or more small base stations based on the almost blank subframe pattern information and the channel information of the terminal connected to the one or more macro base stations or the one or more small base stations, and transmit, to each base station, the interference control information generated for each base station.

Advantageous Effects of Invention

The centralized interference control is possible by separately providing the interference control device controlling the interference by the plurality of base stations. A method of determining the ABS ratio and the ABS pattern when performing the centralized interference control by the interference control device is suggested. A scheduling method based on a signal strength or a location of the terminal in the small base station is suggested.

BEST MODE

In the present specification and claims, the term "include" does not exclude other elements or operations. In the present specification and claims, a singular expression may include a plural expression unless specially indicated otherwise. For example, a macro base station, a small base station, and a terminal may indicate one or more entities, respectively. In the present specification and claims, the term "base station" may be mixedly used with an evolved-NodeB, a NodeB, a wireless access point, a cell, or the like. In the present specification and claims, the term "low power base station" may be mixedly used with a small base station, a pico base station, and the like. In the present specification and claims, the term "interference coordinator" which is a functional entity connected to each base station, may be mixedly used with a central entity, a central interference controller, and the like.

Hereinafter, various embodiments of the present disclosure will be described with reference to the accompanying drawings. In the following description, only a portion required to understand an operation according to an embodiment of the present disclosure is described and description for other portions will be simplified or omitted in order not to obscure the gist of the present disclosure. Here, features of the present disclosure are not limited to the above described examples, and may include even modifications of the respective configurations or additional functions described below. In the accompanying drawings, some elements may be exaggerated for illustrative purpose and are not illustrated in proportion to a size thereof.

Figure 1:
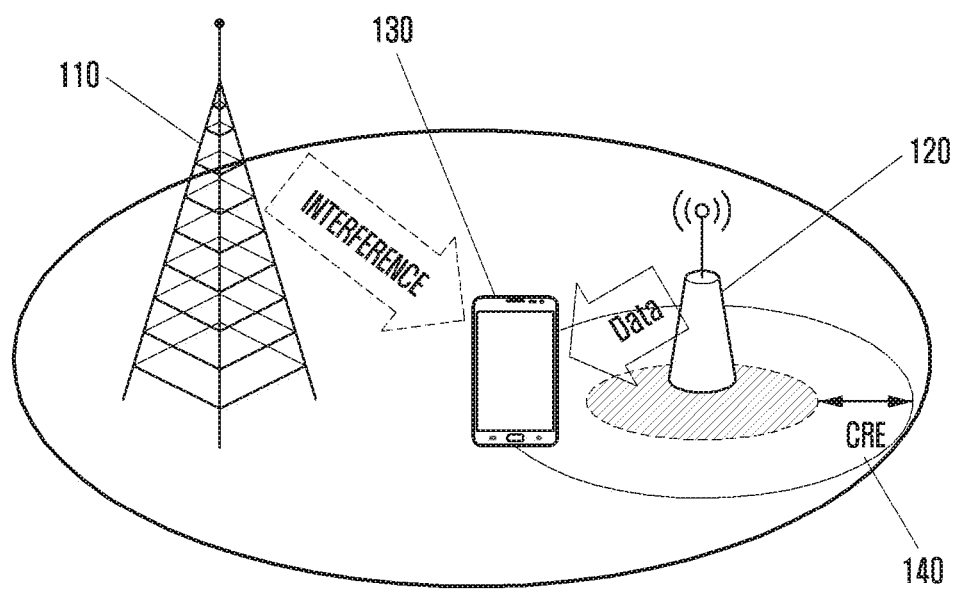
FIG. 1 shows communication between a terminal and a small base station and interference from a macro base station.

FIG. 1 shows communication between a terminal and a small base station and interference from a macro base station.

Referring to FIG. 1, the system includes a macro base station 110, a small base station 120, and a terminal 130. FIG. 1 illustrates a case in which the number of macro base station 110, the number of small base station 120, and the number of terminal 130 is one, respectively, but the present disclosure may also be applied to a case in which two or more small base stations 120, or two or more terminals 130 are included in an area of one macro base station 110. In FIG. 1, the terminal 130 is located in a range of a cell range expansion (CRE) 140. The terminal 130 located in the range of the CRE 140 may not perform communication with the small base station 120 in a subframe in which the macro base station 110 performs transmission, and performs communication with the small base station 120 in which the macro base station 110 does not perform transmission.

Figure 2:
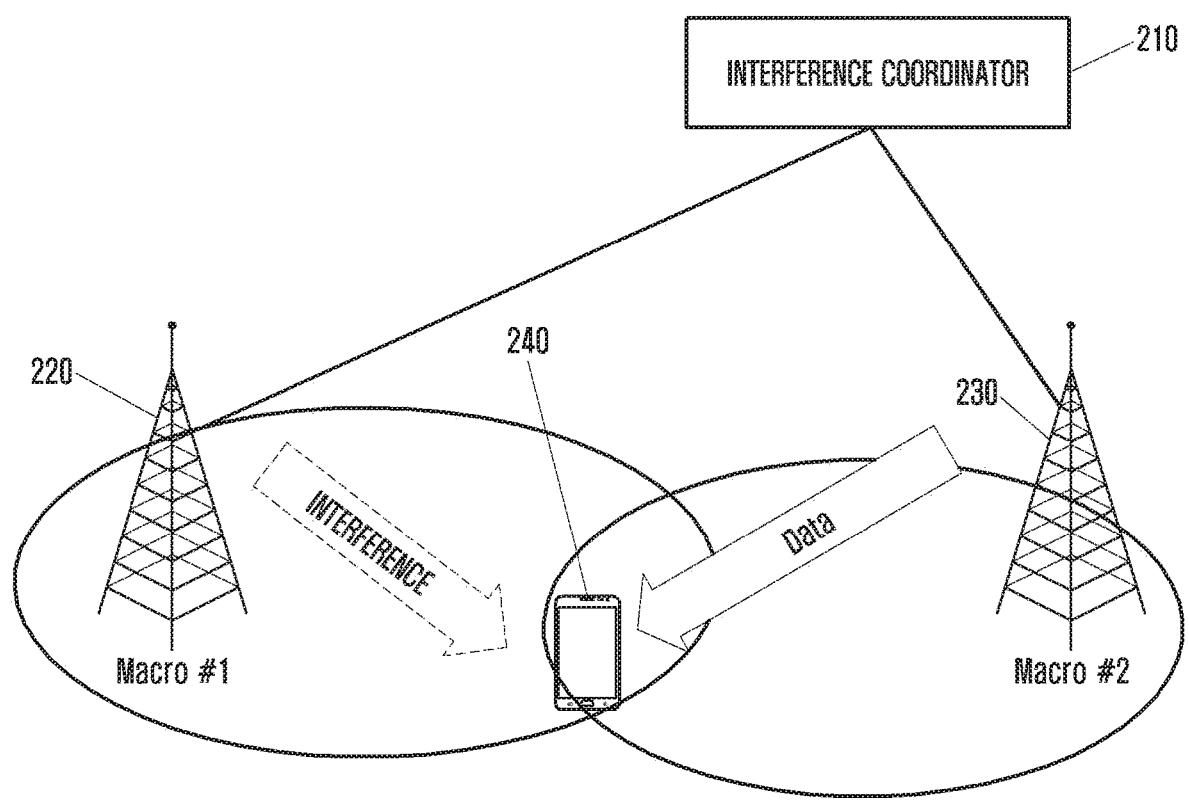
FIG. 2 shows interference of a neighboring base station on a terminal and connection between an interference coordinator and base stations.

FIG. 2 shows interference of a neighboring base station on a terminal and connection between an interference coordinator and base stations.

Referring to FIG. 2, the system includes an interference coordinator 210, a first macro base station 220, a second macro base station 220, and a terminal 240. FIG. 2 illustrates a case in which the number of macro base stations 220 and 230 is two, and the number of terminal 240 is one, but the present disclosure may also be applied to a system in which three or more macro base stations 220 and 230, or two or more terminals 240 are included. FIG. 2 illustrates that the second macro base station 230 transmits data to the terminal, and a signal transmitted by the first macro base station 220 acts as interference on the terminal 240. The interference coordinator 210 is connected to the first macro base station 220 and the second macro base station 230, respectively, to transmit and receive data. Although not illustrated in FIG. 2, the interference coordinator 210 may also be connected to a small base station (not illustrated) to transmit and receive data. A signal of a neighboring macro base station or a neighboring small base station may act as interference in communication between the second macro base station 230 and the terminal 240.

Figure 3:
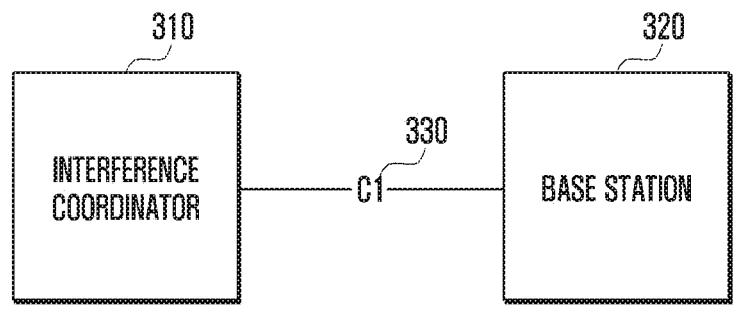
FIG. 3 shows connection between an interference coordinator and a base station.
Figure 3:
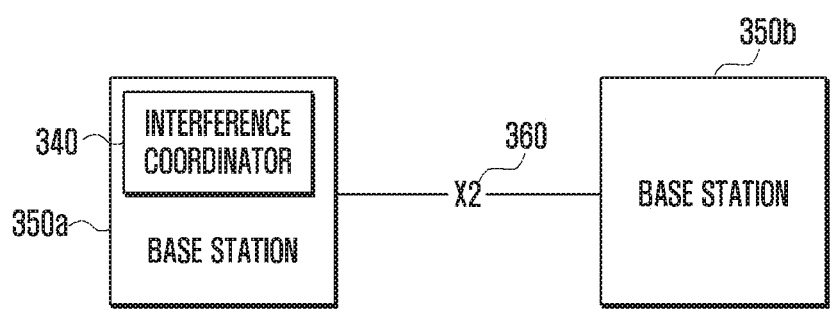
Figure 3:
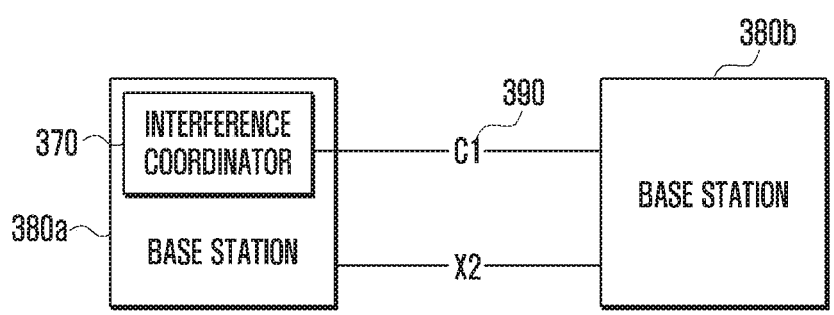

FIG. 3 shows connection between an interference coordinator and a base station.

The interference coordinator which is a logical entity performing an interference mitigation function by a base station may be located in various physical locations. For example, the interference coordinator may be located in a base station, a mobility management entity (MME), a serving gateway (S-GW), or the like, and may exist as a separate device.

Referring to FIG. 3(a), an interference coordinator 310 may be connected to a base station 320 through a specific interface 330. In the present specification, for convenience, the specific interface 330 will be referred to as a C1 interface.

Referring to FIG. 3(b), an interference coordinator 340 may be located in a base station (e.g., first base station) 350a. Here, the interference coordinator 340 may be considered as a functional entity. In order for the interference coordinator 340 to perform an appropriate function, the base station 350a may transfer information received from another base station (e.g., second base station) 350b through an X2 interface 360 to the interference coordinator 340. Further, the interference coordinator 340 may transfer information to the second base station 350b through the first base station 350a.

Referring to FIG. 3(c), an interference coordinator 370 may be located in a base station (e.g., first base station) 380a, similar to that as illustrated in FIG. 3(b). However, there is a difference in that a C1 interference 390 is defined between the interference coordinator 370 and another base station (e.g., second base station) 380b in FIG. 3(c), such that necessary information may be directly transmitted and received through the C1 interface 390. Here, the interference coordinator 110 may be considered as a logical entity.

Figure 4:
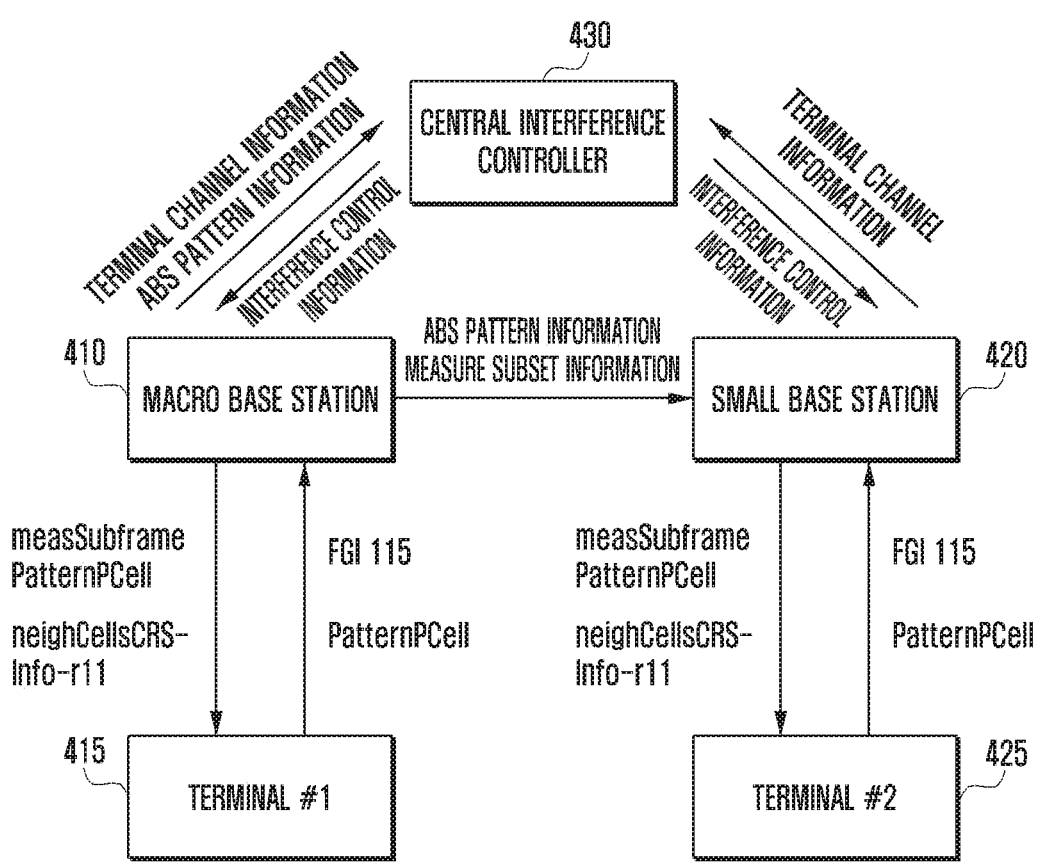
FIG. 4 shows information exchange between respective entities at the time of centralized interference control.

FIG. 4 shows information exchange between respective entities at the time of centralized interference control.

A macro base station 410 transfers control information in a time period (subframe) unit to a small base station 420 in an area of the macro base station 410. The control information may include almost blank subframe (ABS) pattern information. The ABS pattern information may correspond to information indicating whether each time unit (e.g., a subframe having a length of 1 ms) is configured as an ABS with respect to a certain time period (e.g., 40 ms), in a bitmap form. The macro base station 410 may transfer to the small base station 420 measurement subset information indicated as a subset of the ABS, separately from the control information. The small base station 420 may transfer the measurement subset information to a terminal (e.g. second terminal) 425 receiving downlink data from the small base station 420. The measurement subset information may be transferred using measSubframePatternPCell (defined in standard TS36.311). Meanwhile, the control information may include base station information of the macro base station 410.

The second terminal 425 performs channel measurement in the subset of the ABS pattern included in the measurement subset information, separately from a subframe other than the ABS. That is, the second terminal 425 may perform channel measurement in the ABS period and channel measurement in a period other than the ABS period. Meanwhile, the small base station 420 may also autonomously generate measurement subset information without receiving the measurement subset information from the macro base station 410, and transfer the generated measurement subset information to the second terminal 425.

In a subframe configured as an ABS, the macro base station 410 transmits a cell-specific reference signal (CRS), a primary synchronization signal (PSS)/secondary synchronization signal (SSS), a physical broadcast channel (PBCH), or the like, but does not transmit a physical downlink shared channel (PDSCH) related to data. Accordingly, the second terminal 425 performs channel measurement in a state in which interference by the macro base station 410 is mitigated. The terminal may perform measurement by distinguishing a subframe configured as an ABS and a subframe that is not configured as an ABS in performing channel quality indicator (CQI) measurement for link connection (reference signal received power (RSRP) and reference signal received quality (RSRQ)) and data reception.

The second terminal 425 performs channel measurement for link connection and data reception. A CRS-interference mitigation (CRS-IM) function means a function of mitigating interference by a CRS of a neighboring cell received by being mixed in a data region (PDSCH) when the terminal performs channel measurement and data reception. When the second terminal 425 has the CRS-IM function, the channel measurement may be performed by mitigating CRS interference of the macro base station 410 in the measurement subset according to the measurement subset information, based on assistance information transferred using neighCellsCRS-Infor-r11 (defined in standard TS 36.311). Further, when the second terminal 425 receives data from the small base station 420 in the ABS period, the CRS interference of the macro base station 410 is mitigated, such that improved data transmission is possible.

The macro base station 410 transfers, to an interference coordinator 430, channel information of a terminal (e.g., first terminal) 415 receiving downlink data from the macro base station 410. The macro base station 410 transfers, to the interference coordinator 430, ABS pattern information determined by the macro base station 410, separately from the channel information of the first terminal 415. The small base station 420 transfers, to the interference coordinator 430, channel information of the second terminal 425 receiving downlink data from the small base station 420.

The interference coordinator 430 generates interference control information for each base station using the information (the channel information of the first terminal 415, the ABS pattern information, and the channel information of the second terminal 425) received from the macro base station 410 and the small base station 420. The interference coordinator 430 may further consider traffic information of the terminals 415 and 425 connected to the base stations 410 and 420 respectively, in addition to the information received from the macro base station 410 and the small base station 420 when generating the interference control information. Meanwhile, although FIG. 4 illustrates a case in which the number of macro base station 410 and the number of small base station 420 are one, respectively, but the number of macro base station 410 and the number of small base station 420 are not limited thereto. In a case in which the number of macro base station 410 and the number of small base station 420 are plural, respectively, or in a case in which the number of terminals 415 and 425 connected to the base stations 410 and 420 respectively is plural, an amount of information that the base stations 410 420 need to consider to generate the interference control information is increased. The interference coordinator 430 transfers the generated interference control information to the respective base stations 410 and 420.

The interference control information includes information on a time period (subframe) in which the respective base stations 410 and 420 does not transmit an output. The information on the time period (subframe) in which an output is not transmitted may have a bitmap form, similar to the ABS pattern information.

The macro base station 410 performs scheduling based on the interference control information received from the interference coordinator 430 and the ABS pattern information generated by the macro base station 410. The macro base station 410 may perform scheduling so that downlink data transmission is not performed in a subframe in which transmission is restricted according to the interference control information and the ABS pattern information. When the number of terminals 425 connected to the macro base station 410 is two or more, the macro base station 410 selects a target terminal 415 to which downlink data is to be transmitted in a subframe in which transmission is not restricted. At this time, the macro base station 410 may use a predetermined scheduling metric when selecting the terminal 415. The predetermined scheduling metric may use interference information of a neighboring base station included in the interference control information received from the interference coordinator 430 and reception channel state information estimated for each terminal.

The small base station 420 performs scheduling for the terminal 425 connected to the small base station 420 based on the interference control information received from the interference coordinator 430 and the ABS pattern information received from the macro base station 410. Meanwhile, the small base station 420 may also perform scheduling by considering only the interference control information received from the interference coordinator 430 without considering the ABS pattern information received from the macro base station 410.

The small base station 420 may preferentially consider whether the second terminal 425 connected to the small base station 420 is located in a range of cell range expansion (CRE) when performing scheduling for a subframe in which transmission is not restricted. The small base station 420 may preferentially allocate a resource to the terminal located in the range of CRE when performing scheduling for the subframe in which transmission is not restricted. When the number of terminals located in the range of CRE is two or more, the small base station 420 may select a target terminal using a predetermined scheduling metric. The predetermined scheduling metric may use interference of a neighboring base station in the interference control information received by the small base station 420 from the interference coordinator 430 and reception channel state information estimated for each terminal.

Whether the second terminal 425 is located in the range of the CRE may be determined based on whether a strength of a signal received from the macro base station 410 is greater than a strength of a signal received from the small base station 420 by a predetermined value or more. The signal may include, for example, reference signal received power (RSRP). When the strength of the signal received from the macro base station 410 is greater than the strength of the signal received from the small base station 420 by the predetermined value or more, it may be determined that the second terminal 425 is located in the range of the CRE and intentionally connected to the small base station 420. When the second terminal 425 is located in the range of the CRE, data transmission of the second terminal 425 may be scheduled only in predetermined subframes. For example, when the second terminal 425 and the small base station 420 perform communication through frequency-division duplex (FDD), in consideration of retransmission, scheduling may be performed so that the second terminal 425 transmits data to the small base station 420 only in a corresponding subframe in which transmission is not restricted and a subframe after 8 ms in which transmission is not restricted.

The small base station 420 may perform scheduling so that downlink data transmission is performed for only a terminal that is not located in the range of CRE in a subframe in which transmission is restricted according to the interference control information. When the number of terminals that are not located in the range of CRE is two or more, the small base station 420 may select a target terminal using a predetermined scheduling metric. The predetermined scheduling metric may use interference of a neighboring base station in the interference control information received by the small base station 420 from the interference coordinator 430 and a reception channel state estimated for each terminal.

When the second terminal 42 is a terminal having a CRS-IM function, interference mitigation may be performed for a CRS received from the macro base station 410 in a subframe in which transmission of the macro base station 410 is restricted.

Figure 5:
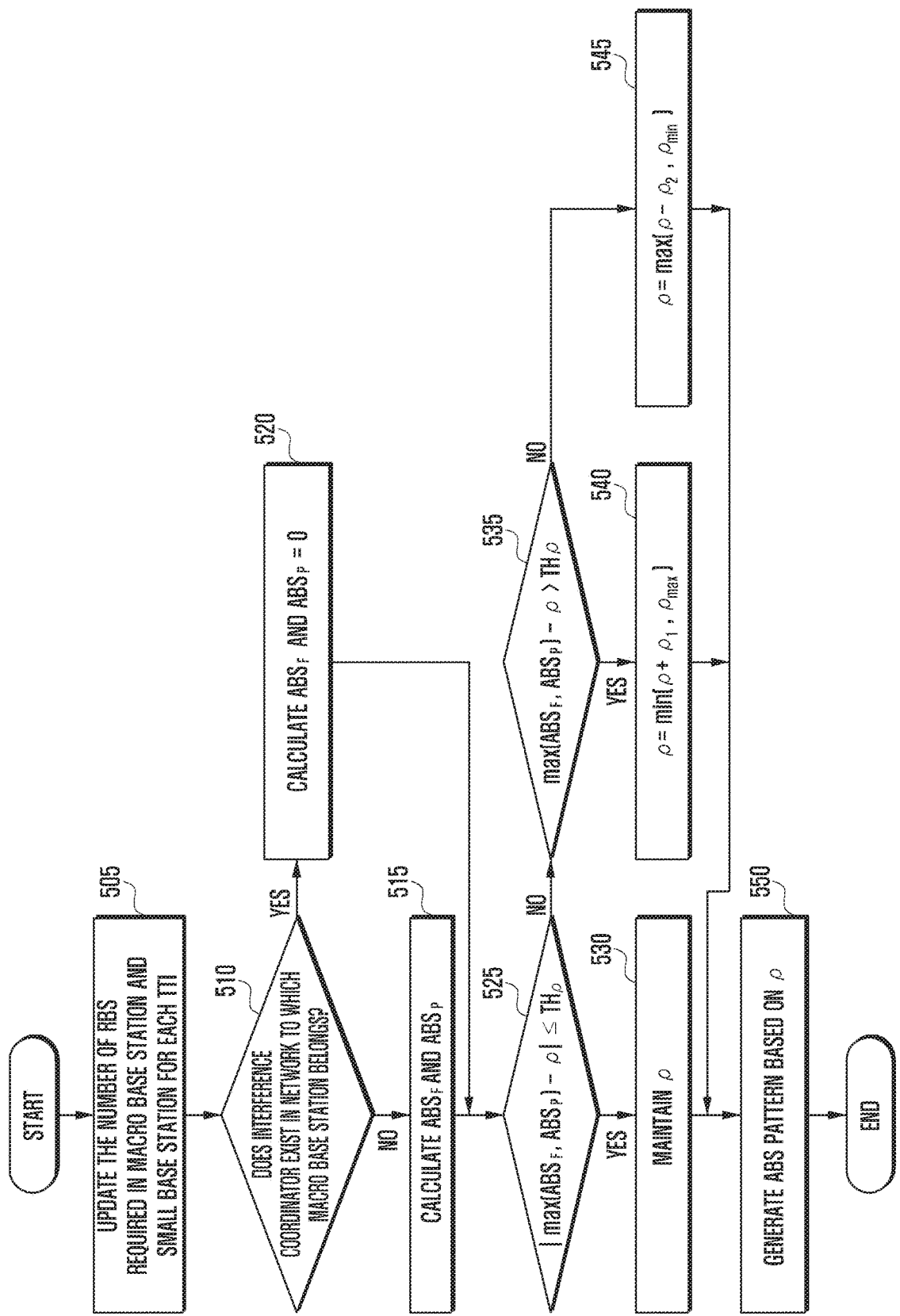
FIG. 5 shows a process of determining, by a macro base station, an ABS ratio and an ABS pattern.

FIG. 5 shows a process of determining, by a macro base station, an ABS ratio and an ABS pattern.

The macro base station first determines an ABS ratio ($ABS_{ratio}=ABS_\rho$) to generate an ABS pattern to be transmitted to the small base station. In order to determine the ABS ratio, the macro base station updates the number of resource blocks (RB) required in the macro base station and the small (pico) base station for each TTI (505). The RB update is performed after UE scheduling in each subframe.

When a corresponding TTI (subframe) is configured as an ABS or transmission is restricted by interference control, in the macro base station, a guaranteed bit rate (GBR) terminal and a non-GBR terminal are distinguished as below to update the number of RBs.

$$N_{RB}{}^{GBR} += 0 \qquad \text{[Equation 1]}$$

$$N_{RB}{}^{nonGBR} += 0 \qquad \text{[Equation 2]}$$

The GBR terminal means a terminal to which GBR traffic is serviced, and the non-GBR terminal means a terminal to which non-GBR traffic is serviced. The GBR traffic or non-GBR traffic may be serviced through a separate bearer and one terminal may service a plurality of bearers. For convenience of explanation, it is assumed that one terminal uses one bearer to provide a service.

When the corresponding TTI is not configured as an ABS in the macro base station and data transmission is possible, the number of RBs is updated as below.

$$N_{RB}^{GBR} += QuHGBR \text{ the number of allocated } RBs \qquad \text{[Equation 3]}$$

$$N_{RB}^{nonGBR} += Q_{uHnonGBR}\min\left\{\frac{BO(u)}{TBSperRB(u)}, N_{RB}^{DL}\right\} \qquad \text{[Equation 4]}$$

Here, BO represents an amount of data requested to be transmitted for each user, and may correspond to an amount of radio link control (RLC) buffer or an amount of separate message buffer. TBSperRB means a size of a transport block that may be allocated for each RB according to a user channel state.

In the small base station, the number of RBs is separately updated depending on whether the CRE is applied to the terminal. When transmission is restricted in a corresponding TTI by interference control, in the small base station, the update is performed as below. It is assumed that the GBR terminal is not present in the CRE region.

$$N_{RB}{}^{GBR} += 0 \qquad \text{[Equation 5]}$$

$$N_{RB}{}^{nonGBR,nonCRE} += 0 \qquad \text{[Equation 6]}$$

$$N_{RB}{}^{nonGBR,CRE} += 0 \qquad \text{[Equation 7]}$$

In the case of TTI in which data transmission is possible, in the small base station, the number of RBs is updated as below.

$$N_{RB}^{GBR} += QuHGBR \text{ the number of allocated } RBs \qquad \text{[Equation 8]}$$

$$N_{RB}^{nonGBR,nonCRE} += Q_{uHnonGBR\&nonCRE}\min\left\{\frac{BO(u)}{TBSperRB(u)}, N_{RB}^{DL}\right\} \qquad \text{[Equation 9]}$$

$$N_{RB}^{nonGBR,CRE} += Q_{uHnonGBR\&CRE}\min\left\{\frac{BO(u)}{TBSperRB(u)}, N_{RB}^{DL}\right\} \qquad \text{[Equation 10]}$$

The macro base station may determine whether an interference coordinator exists in a network to which the macro base station belongs (whether the centralized interference control is performed) in order to determine the ABS ratio. Whether the interference coordinator exists in the network may be determined based on whether interference control information is received from the interference coordinator.

When it is determined that the interference coordinator does not exist in the network, the macro base station calculates two intermediate variables (515).

A first intermediate variable AB S is calculated by the following Equation 11.

$$ABS_F = \frac{QiHpicoN_{RB}^{nonGBR,CRE}}{QiHmacroN_{RB}^{GBR} + QiHpico(N_{RB}^{nonGBR,nonCRE} + N_{RB}^{nonGBR,CRE})} =$$ [Equation 11]

$$= \frac{QiHpico\frac{(100 - DAs(i))(1 + l_{nonGBR}(i))}{100 - DL\_GBR\_PRB\_usage(i)}}{QiHmarcol_{nonGBR(i)} + QiHpicol_{nonGBR(i)}}$$

$$l_{nonGBR}(i) = \frac{100 - DL\_GBR\_PRB\_usage(i) - CAC(i)}{CAC(i)}, \; i = \text{cell index}$$ [Equation 12]

In Equation 12, DL_GBR_PRB_usage(i) represents downlink GBR PRB usage of a cell i and may be used in a range of 1 to 100. In Equation 12, composite available capacity (CAC) and DL_GBR_PRB_usage represent an entire load of the base station and a GBR load, respectively, and may each be individually defined.

A second intermediate variable $ABS_P$ is calculated by the following Equation 13.

$$ABS_P = 1 - \text{macroPRBusage} - \text{ABSmargin}$$ [Equation 13]

In Equation 13, macroPRBusage is a usage amount of a physical resource block of the macro base station, and ABSmargin is a separate constant for preventing an excessive ABS ratio from being set when configuring the ABSP.

When it is determined that the interference coordinator exists in the network, the macro base station calculates only the first intermediate variable $ABS_F$ and leaves the second intermediate variable as 0 (520). A method for calculating the first intermediate variable ABSF is the same as the case in which it is determined that the interference coordinator does not exist in the network.

After calculating the intermediate variables in step 515 or 520, the macro base station calculates a difference value by comparing a larger value of the first intermediate variable $ABS_F$ and the second intermediate variable $ABS_P$ with a current ABS ratio ρ (525). When it is determined that the interference coordinator exists in the network, the larger value of the first intermediate variable $ABS_F$ and the second intermediate variable $ABS_P$ is a first $ABS_F$.

The macro base station determines to maintain the current ABS ratio when the calculated difference value is equal to or smaller than a predetermined value TH, (530). The macro base station determines to change the ABS ratio when the calculated difference value is equal to or larger than the predetermined value (535). In step 540, when a value obtained by subtracting the current ABS ratio from the larger value of the first $ABS_F$ and the second intermediate variable $ABS_P$ is larger than the predetermined value $TH_ρ$, the current ABS ratio may be increased by a predetermined first value $ρ_1$, within a range of equal to or smaller than a predetermined maximum ABS ratio $ρ_{max}$. Unlike this, in step 545, when the value obtained by subtracting the larger value of the first $ABS_F$ and the second intermediate variable $ABS_P$ from the current ABS ratio is larger than the predetermined value $TH_ρ$, the current ABS ratio may be decreased by a predetermined second value $ρ_2$, within a range of equal to or larger than a predetermined minimum ABS ratio $ρ_{min}$. The predetermined first value and the predetermined second value may also have the same value.

The macro base station generates an ABS pattern based on the ABS ratio determined in step 530, 540, or 545 (550). Each macro base station generates the ABS pattern, respectively. When a separate interface for sharing the ABS pattern is not defined between the macro base stations, and an interference coordinator does not exist in a network to which the macro base station belongs, each macro base station may not know an ABS pattern generated by another macro base station, thus even when the ABS pattern is applied for a serving macro base station, interference by a neighboring macro base station may not be controlled.

On the contrary, when the interference coordinator exists in the network to which the macro base station belongs, the interference coordinator performs configuration so that the ABS patterns do not overlap between the base stations, such that interference by a neighboring macro base station may also be controlled in addition to the interference between a small base station belonging to the region of the macro base station and the macro base station. When the ABS ratio is determined, ABS patterns corresponding to the ABS ratio may be determined by a shift of a default ABS pattern. In this case, when a start bit in which the default pattern starts is changed, even in the case of using a plurality of ABS patterns corresponding to the same ABS ratio, an overlapping range of the ABS patterns is decreased, thereby decreasing interference by a neighboring base station. For example, an identifier (e.g., physical cell ID (PCID) or virtual cell ID (VCID)) of a cell provided by each macro base station may be set to be an offset value for application of the ABS pattern, and a modulo function may be applied as below so that the offset value corresponds to the start bit of the default ABS pattern in each cell.

$$\text{pattern\_offset} = PCID \bmod n$$ [Equation 14]

Figure 6:
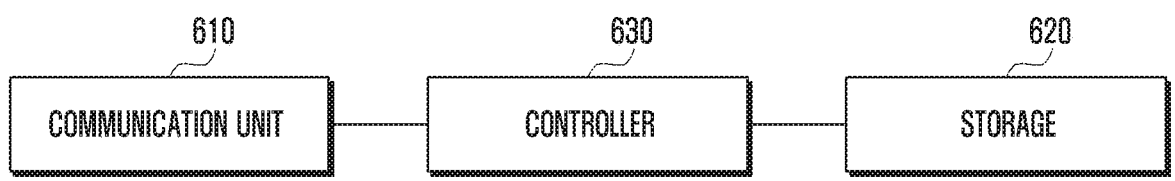
FIG. 6 is a diagram showing a structure of a base station according to an embodiment of the present disclosure.

FIG. 6 is a diagram showing a structure of a base station according to an embodiment of the present disclosure.

Referring to FIG. 6, the base station may include a communication unit 610, a storage 620, and a controller 630. The base station may correspond to a macro base station or a small base station.

The communication unit 610 performs a function of transmitting and receiving corresponding data for wireless communication of the base station. The communication unit 610 may transmit and receive a signal to and from another base station, a terminal or an interference coordinator. The communication unit 610 may include a radio frequency (RF) transmitter up-converting and amplifying a frequency of a transmitted signal, and an RF receiver low-noise amplifying a received signal and down-converting a frequency of the signal. The communication unit 610 may receive data through a wireless channel and output the data to the controller 630, and transmit the data output from the controller 630 through the wireless channel.

The storage 620 serves to store a program required for an operation of the base station and data generated during the operation of the base station, and may be divided into a program region and a data region.

The controller 630 controls an overall state and an operation of all units configuring the base station. The controller 630 may control to store information received through the communication unit 610 in the storage 620. The controller 630 may control other units to perform various embodiments described in the present disclosure. For example, the controller 630 may control the operation in FIG. 5.

Figure 7:
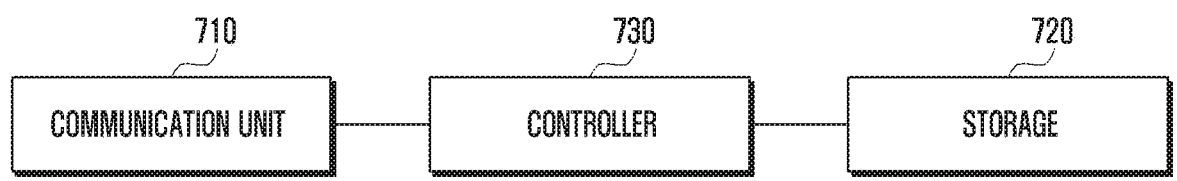
FIG. 7 is a diagram showing a structure of an interference coordinator according to an embodiment of the present disclosure.

FIG. 7 is a diagram showing a structure of an interference coordinator according to an embodiment of the present disclosure.

Referring to FIG. 7, the interference coordinator may include a communication unit 710, a storage 720, and a controller 730.

The communication unit 710 performs a function of transmitting and receiving corresponding data for wireless communication of the interference coordinator. The communication unit 710 may transmit and receive a signal to and from one or more base stations. The communication unit 710 may include a radio frequency (RF) transmitter up-converting and amplifying a frequency of a transmitted signal, and an RF receiver low-noise amplifying a received signal and down-converting a frequency of the signal. The communication unit 710 may receive data through a wireless channel and output the data to the controller 730, and transmit the data output from the controller 730 through the wireless channel.

The storage 720 serves to store a program required for an operation of the interference coordinator and data generated during the operation of the interference coordinator, and may be divided into a program region and a data region.

The controller 630 controls an overall state and an operation of all units configuring the interference coordinator. The controller 730 may control to store information received through the communication unit 710 in the storage 720. The controller 730 may control other units to perform various embodiments described in the present disclosure.

Figure 8:
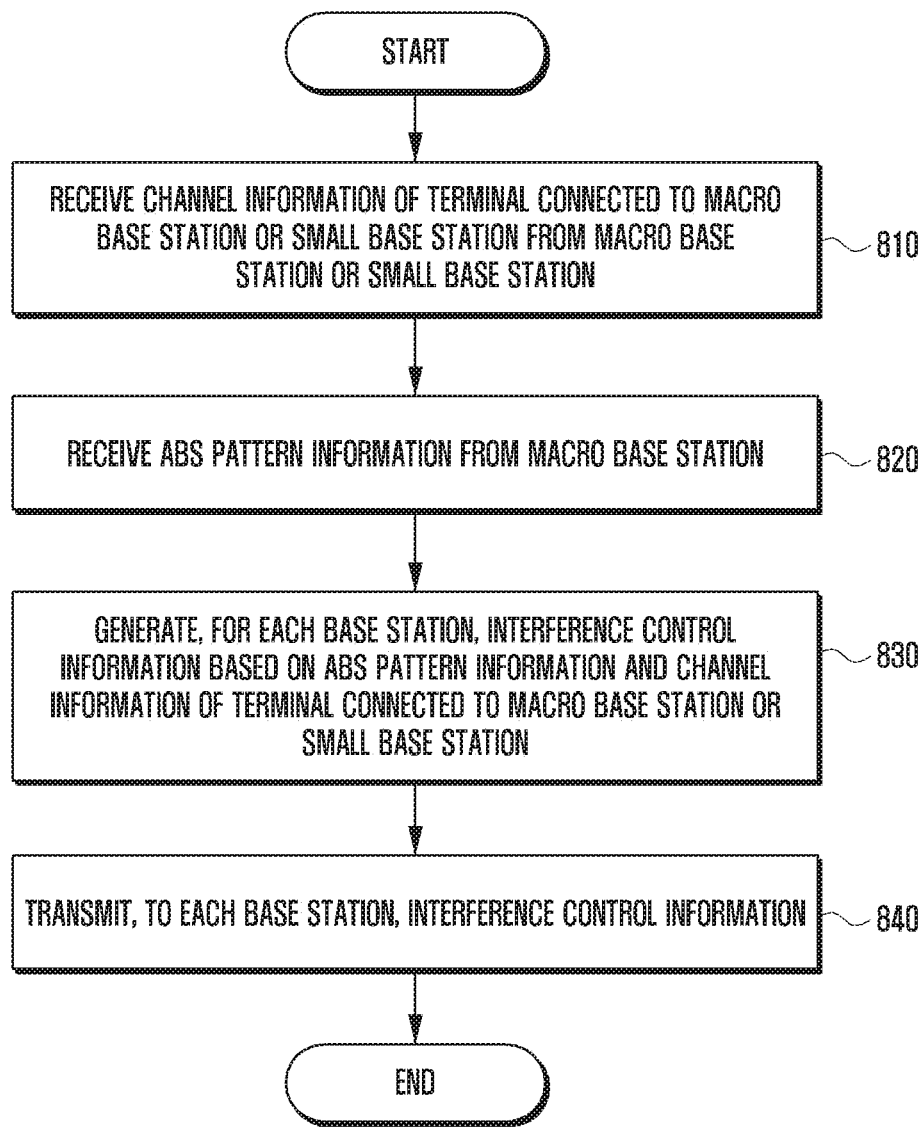
FIG. 8 shows a process of transmitting and receiving, by a device for adjusting interference of a plurality of base stations, data to and from the plurality of base stations.

FIG. 8 shows a process of transmitting and receiving, by a device for adjusting interference of a plurality of base stations, data to and from the plurality of base stations.

In step 810, a device (interference coordinator) for adjusting interference of a plurality of base stations receives channel information of a terminal connected to one or more macro base stations or one or more small base stations from the one or more macro base stations or the one or more small base stations. In step 820, the interference coordinator receives ABS pattern information from the one or more macro base stations. In step 830, the interference coordinator generates, for each base station, interference control information for the one or more macro base stations or the one or more small base stations based on the ABS pattern information and the channel information of the terminal connected to the one or more macro base stations or the one or more small base stations. In step 840, the interference coordinator transmits, to each base station, the interference control information generated for each base station.

Figure 9:
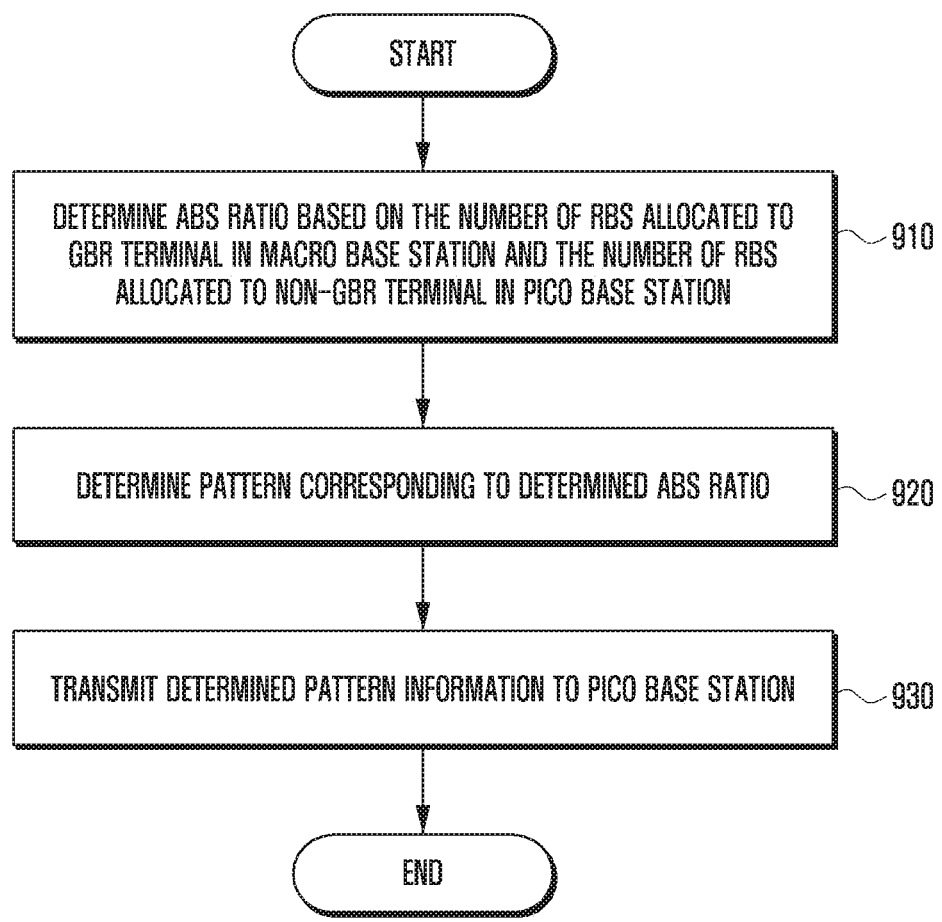
FIG. 9 shows an interference control process of a macro base station.

FIG. 9 shows an interference control process of a macro base station.

In step 910, the macro base station determines an ABS ratio based on the number of RBs allocated to a GBR terminal in the macro base station and the number of RBs allocated to a non-GBR terminal in a pico base station. In step 920, the macro base station determines a pattern corresponding to the determined ABS ratio. The determination of the pattern may be performed according to the process in FIG. 5. In step 930, the macro base station transmits the determined pattern information to the pico base station.

Figure 10:
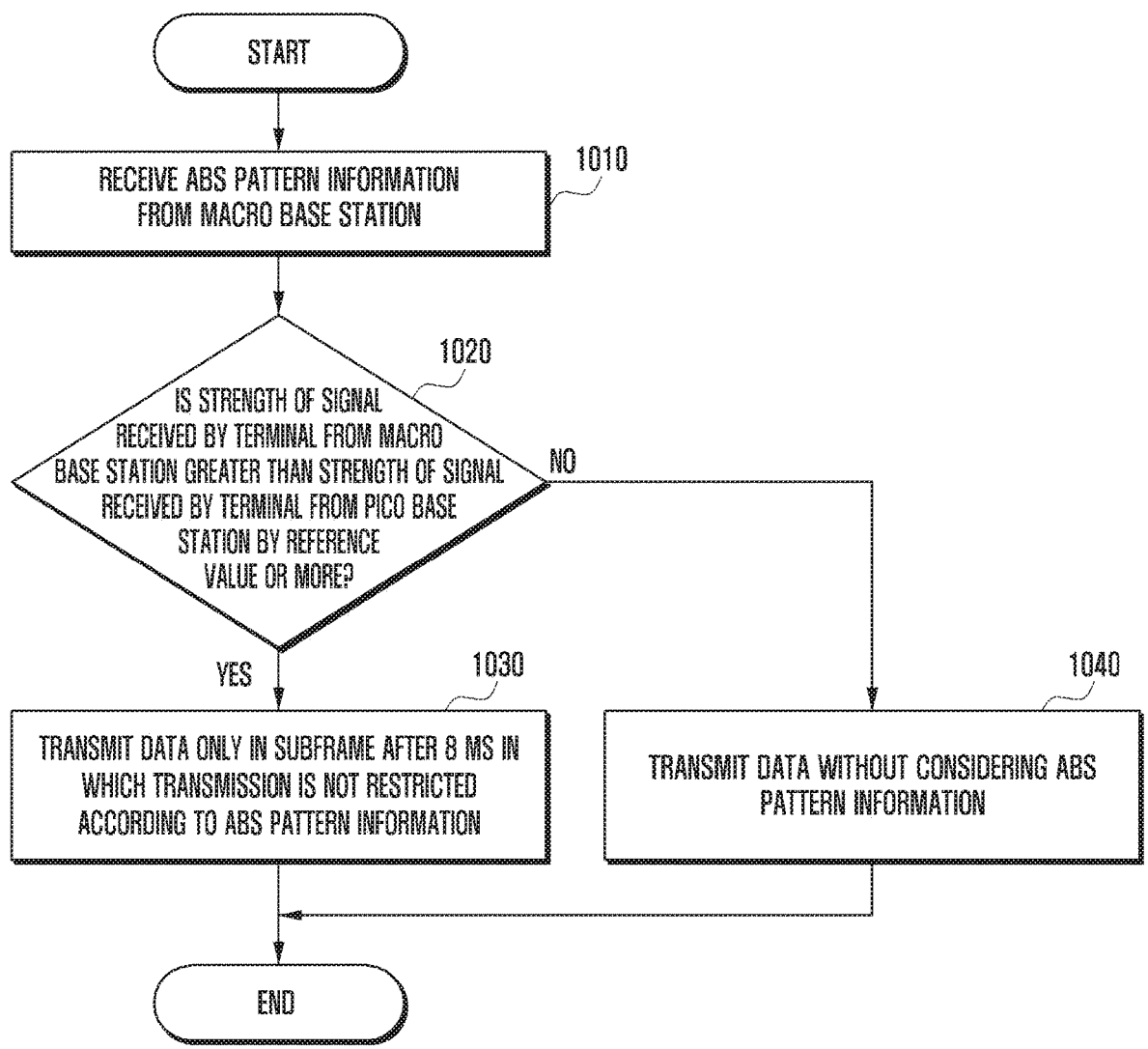
FIG. 10 shows an interference control process of a pico base station.

FIG. 10 shows an interference control process of a pico base station.

In step 1010, the pico base station receives ABS pattern information from a macro base station. In step 1020, the pico base station determines whether a strength of a signal received by the terminal from the macro base station is greater than a strength of a signal received by the terminal from the pico base station by a reference value or more. In step 1030, when the strength of the signal received by the terminal from the macro base station is greater than the strength of the signal received by the terminal from the pico base station by the reference value or more, the pico base station transmits data to the terminal only in a subframe after 8 ms in which transmission is not restricted according to the ABS pattern information. In step 1040, when the strength of the signal received by the terminal from the macro base station is equal to or less than the strength of the signal received by the terminal from the pico base station by the reference value or more, the pico base station transmits data to the terminal without considering the ABS pattern information.

The operations of the base station and the terminal described above may be realized by including a memory device storing a corresponding program code in any unit in the base station or the terminal device. That is, the controller of the base station or the terminal device may execute the above-described operations by reading the program code stored in the memory device by a processor or a central processing unit (CPU) to execute.

The entities, various units of the base station or the terminal device, and modules described in the present specification may be operated by using a hardware circuit, for example, a complementary metal oxide semiconductor-based logical circuit, firmware, software, and/or a combination of hardware and firmware and/or software embedded in a machine readable medium. As an example, various electric configurations and methods may be carried out by using electric circuits such as transistors, logic gates, and an application specific integrated circuit (ASIC).

The embodiments disclosed in the present specification and the accompanying drawings have been provided merely as specific examples in order to easily describe the technical idea and assist in understanding of the present disclosure and do not limit the scope of the present disclosure. It is obvious to those having ordinary knowledge in the art to which the present disclosure pertains that various modifications may be made without departing from the scope of the present disclosure, in addition to the embodiments disclosed herein.

Meanwhile, preferred embodiments of the present disclosure have been described in the present specification and the accompanying drawings. Herein, although specific terms have been used, these are merely used for the purpose of easily describing the present disclosure and helping understanding of the present disclosure, but not used for limiting the scope of the present disclosure. It is obvious to those having ordinary knowledge in the art to which the present disclosure pertains that various modifications may be made without departing from the scope of the present disclosure, in addition to the embodiments disclosed herein.

What is claimed is:

1. A method by which a device for adjusting interference of a plurality of base stations transmits and receives data to and from the plurality of base stations, the method comprising:

receiving, by a processor, channel information of a terminal from a first base station, wherein the terminal is connected to the first base station among the plurality of base stations;

receiving, by the processor, almost blank subframe (ABS) pattern information from at least two base stations including the first base station among the plurality of base stations;

determining, by the processor, a first interference control information which ABS patterns does not overlap between the plurality of base stations for the first base station based on the channel information of the terminal and the received ABS pattern information;

transmitting, by a transceiver, to the first base station, the first interference control information to modify a first ABS pattern to be transmitted to a second base station;

determining, by the processor, a second interference control information based on the ABS pattern information and the channel information of the terminal; and transmitting, by the transceiver, the second interference control information to modify a second ABS pattern.

2. The method of claim 1, wherein the first base station corresponds to a first macro base station and the second base station corresponds to a small base station or a second macro base station.

3. The method of claim 1, wherein the first base station corresponds to a small base station and the second base station corresponds to a macro base station.

4. A device for adjusting interference of a plurality of base stations, the device comprising:

a transceiver; and a processor configured to:

control the transceiver to receive channel information of a terminal from a first base station, wherein the terminal is connected to the first base station among the plurality of base stations, control the transceiver to receive almost blank subframe (ABS) pattern information from at least two base stations including the first base station among the plurality of base stations, control the transceiver to determine a first interference control information which ABS patterns does not overlap between the plurality of base stations for the first base station based on the channel information of the terminal and the received ABS pattern information, control the transceiver to transmit, to the first base station, the first interference control information to modify a first ABS pattern to be transmitted to a second base station, control the transceiver to determine a second interference control information based on the ABS pattern information and the channel information of the terminal, and control the transceiver to transmit the second interference control information to modify a second ABS pattern.

\* \* \* \* \*